(12) United States Patent
Rehm et al.

(10) Patent No.: US 7,141,946 B2
(45) Date of Patent: Nov. 28, 2006

(54) METHOD AND APPARATUS FOR PROVIDING OPTIMAL ACCELERATION FEEDBACK

(75) Inventors: Thomas J. Rehm, Mequon, WI (US); Peter B. Schmidt, Franklin, WI (US); John Joseph Golownia, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 294 days.

(21) Appl. No.: 10/662,556

(22) Filed: Sep. 15, 2003

(65) Prior Publication Data
US 2005/0057205 A1   Mar. 17, 2005

(51) Int. Cl.
*H02P 5/00* (2006.01)

(52) U.S. Cl. .................. 318/276; 318/278; 318/271; 318/560

(58) Field of Classification Search .............. None
See application file for complete search history.

(56) References Cited

U.S. PATENT DOCUMENTS

| | | | | |
|---|---|---|---|---|
| 3,659,175 | A | * | 4/1972 | Sordello ..................... 318/696 |
| 3,950,683 | A | | 4/1976 | Lamson |
| 4,075,538 | A | * | 2/1978 | Plunkett ..................... 318/52 |
| 4,578,863 | A | | 4/1986 | Laverick |
| 4,808,895 | A | * | 2/1989 | Fujita et al. ................. 318/254 |
| 4,969,757 | A | | 11/1990 | Spina |
| 5,175,483 | A | | 12/1992 | Fujii et al. |
| 5,250,880 | A | * | 10/1993 | Chesney et al. ............ 318/135 |
| 5,343,132 | A | | 8/1994 | Iwashita |
| 5,367,238 | A | | 11/1994 | Sakamoto et al. |
| 5,416,397 | A | * | 5/1995 | Mazzara et al. ............ 318/696 |
| 5,608,631 | A | * | 3/1997 | Tsutsumi et al. ............. 701/74 |
| 5,623,189 | A | | 4/1997 | Hemmer |
| 5,786,678 | A | * | 7/1998 | Kobayashi et al. ......... 318/677 |
| 5,828,014 | A | * | 10/1998 | Goto et al. ................. 187/292 |
| 5,896,949 | A | | 4/1999 | Hamdy et al. |
| 5,936,158 | A | | 8/1999 | Ashizawa et al. |
| 6,041,264 | A | | 3/2000 | Wruck et al. |
| 6,189,836 | B1 | | 2/2001 | Gold et al. |
| 6,527,130 | B1 | * | 3/2003 | Ruddy ......................... 212/278 |

OTHER PUBLICATIONS

Resonant Load Control Methods for Industrial Servo Drives, 2000 IEEE, pp. 1438-1445, Ellis, et al.
Acceleration Feedback Implemented Through The Utilization of An Observer As Applied To Robotic Manipulator; Peter B. Schmidt, Thesis—1991.

* cited by examiner

*Primary Examiner*—Lincoln Donovan
*Assistant Examiner*—Renata McCloud
(74) *Attorney, Agent, or Firm*—Quarles & Brady, LLP; William R. Walbrun

(57) ABSTRACT

A method and apparatus for use with a motor controller that receives a command velocity and that applies voltages to drive a motor at the command velocity, the apparatus comprising a dual inertia lost motion assembly including a motor and a load couplable to the motor, the lost motion assembly characterized by at least some lost motion between the motor and the load, the motor and load together characterized by a total assembly inertia, an acceleration error determiner for generating an acceleration error that is the difference between a derivative of the command velocity and a motor acceleration value and a low pass acceleration error filter filtering the acceleration error and having a gain set as a percentage of the total assembly inertia, the acceleration error filter providing the filtered signal to the controller, the controller using the filtered signal to adjust the applied voltages.

20 Claims, 4 Drawing Sheets

METHOD AND APPARATUS FOR PROVIDING OPTIMAL ACCELERATION FEEDBACK

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is control systems for dual inertia lost motion mechanical systems and more specifically optimal acceleration feedback for use by a controller in controlling a system characterized by lost motion.

This section of this document is intended to introduce various aspects of art that may be related to the present invention described and/or claimed below and provides background information to facilitate a better understanding of the various aspects of the present invention. It should be understood that the statements in this section of this document are to be read in this light, and not as admissions of prior art.

High performance servo drives are used in many different applications and in many different industries. For example, in the media printing industry servo drives are routinely employed to accelerate and decelerate large spools of paper web to wind and unwind and position sections of the web precisely with respect to printer heads and other system components to facilitate application of information on the paper material surfaces. In printing applications and in many other applications precise motor-load control is extremely important.

Typically a velocity command signal is provided to a drive indicating a desired motor load velocity and the drive is configured to apply AC voltages to the motor causing motor velocity to converge toward the command velocity. The relationship between applied voltages and motor velocity is effected by motor-load assembly inertia. For instance, assume first and second motor-load assemblies where a first assembly inertia is half as large as a second assembly inertia. When motor velocity is to be reduced, a much smaller force is required to increase the first assembly than to slow the second assembly at the same rate. Similarly, when motor velocity is to be increased, a much larger force is required to increase the first assembly velocity than to increase the second assembly velocity at the same rate.

Many systems include one or more feedback loops that provide motor-load operating characteristics to the drive for comparison to the command velocity and derivatives thereof so that the drive can adjust motor velocity in a suitable fashion and increase performance. Thus, for instance, some drives include a position feedback loop and/or a velocity feedback loop. In these cases, when the motor position or velocity do not match the commanded position (e.g., the integral of the commanded velocity) and/or the commanded velocity, the drive alters the applied voltages to correct the error.

In theory, in an ideal directly linked motor-load assembly, the load is linked to the motor via an infinitely stiff coupling and the motor and load inertias appear as a single mass or total assembly inertia. A control system for a motor-load assembly including an infinitely stiff coupling is easily constructed with the application of velocity and/or position feedback loops.

In reality, most direct linked motor-load assemblies do not include an infinitely stiff coupling and instead are characterized by some degree of flexibility. In these cases the flexible motor-load coupling can be thought of as a spring between the motor and load masses such that angular load position typically is slightly different than the angular position of the motor.

When a drive includes one or more feedback loops and a motor-load assembly includes a flexible coupling, the combination often causes resonance within the drive-motor-load system. To this end, when a velocity command is received and a drive accelerates a motor toward a command velocity, in the case of a flexible coupling, the motor achieves the desired velocity prior to the lagging load. Because of the spring effect of the flexible coupling, the load often shoots past the command velocity thereby loading the coupling with another spring force that places a torque on the motor which causes the motor velocity to exceed the commanded velocity so that a velocity error is identified by the control system in the drive (e.g., the feedback velocity instantaneously exceeds the commanded velocity). The drive in turn alters the applied voltages to slow the motor-load assembly.

Eventually the spring force within the coupling causes the load velocity to slow such that the load velocity converges toward the motor velocity. However, here again, as the force within the coupling is released, the load velocity may shoot through the motor velocity thereby placing a slowing force on the motor. In response to the slowing motor velocity the drive again alters the applied voltages, this time to increase the motor speed. This oscillating process continues at what is typically referred to as a system resonant frequency.

While many motor-load assemblies include a direct linkage between the motor and the load, other assemblies include some type of indirect coupling such as a gear box, gear train, etc., that introduces lost motion between the motor and the load. Here, the phrase "lost motion" is used to refer to an actual disconnect between the motor and the load that occurs under certain operating circumstances because there is some mechanical "play" or "slack" within the coupling components. For instance, in a simple example, a particularly sloppy gear train may result in a coupling where five degrees of motor rotation separate the relative positions in which the motor engages the load through the gear train in opposite directions. Thus, when rotating in a forward direction the motor-gear train may be engaged with the load at a first angle and the motor may have to be rotated five degrees in the reverse direction relative to the load to engage the load in the other direction. In this case, assume that the motor is initially rotating in the forward direction to drive a coupled load and that the command velocity is reduced to slow motor speed. Unless load friction slows the load at a rate at least as fast as the rate at which the motor speed is reduced, at the instant that the motor speed is reduced, the motor and load become decoupled.

Motor-load assemblies that include lost motion couplings add complex dynamics to drive systems that complicate control tasks appreciably. In this regard, the instantaneous effective inertia associated with the motor changes whenever a lost motion coupling causes the motor-load to couple or decouple. Here, the phrase "effective inertia" is used to refer to the motor inertia alone when the load is decoupled from the motor and to the sum of the motor inertia and the load inertia when the load is coupled to the motor. In many cases the load inertia will be much larger than the motor inertia so that the difference between the effective coupled inertia and effective decoupled inertia is appreciable.

Because inertia effects the relationship between applied voltages and velocity and the effective inertias are different during coupled and decoupled motor-load conditions, drive velocity adjustments that occur during coupled and decoupled motor-load conditions end up causing different velocity modifications. Thus, for instance, given a specific velocity error, independent of whether or not the error occurs when the motor is coupled to the load and when the motor is decoupled from the load, the error will result in the same change in applied voltages to eliminate the error. Here, however, because the coupled and decoupled inertias are different, the effect on velocity is different. Thus each of spring related resonance and lost motion coupling dynamics hamper motor-load assembly control.

One way to eliminate system resonance is to provide filters within the feedback loops that filter out disturbances at the resonant frequencies. Thus, for instance, where a system resonant frequency is known, a notch filter may be provided that specifically eliminates the resonant frequency signal from the feedback loop to the drive.

While filters are routinely used to reduce system resonance, such filters typically have not been employed to minimize the effects of lost motion couplings because they generally do not provide the bandwidth necessary to meet application requirements.

BRIEF SUMMARY OF THE INVENTION

Certain aspects commensurate in scope with the originally claimed invention are set forth here. It should be understood that these aspects are presented merely to provide the reader with a brief summary of certain forms the invention might take and that these aspects are not intended to limit the scope of the invention. Indeed, the invention may encompass a variety of aspects that may not be set forth below.

It has been recognized that an acceleration feedback loop can be provided in addition to a velocity feedback loop in a system characterized by at least some degree of lost motion where the acceleration feedback loop is optimally tuned as a function of the total motor-load inertia. In this regard, it has further been recognized that a low pass filter having a gain of between 0.4 and 0.6 times the total motor-load inertia minimizes system dynamics in a lost motion system. Moreover, it has been recognized that the filter should also be selected to have a time constant of approximately three times the time constant of a velocity loop filter to provide optimal results.

Consistent with the above, in at least some embodiments the invention includes an apparatus for use with a motor controller that receives a command velocity and that applies voltages to drive a motor at the command velocity, the apparatus comprising a dual inertia lost motion assembly including a motor and a load couplable to the motor, the lost motion assembly characterized by at least some lost motion between the motor and the load, the motor and load together characterized by a total assembly inertia, an acceleration error determiner for generating an acceleration error that is the difference between a derivative of the command velocity and a motor acceleration value and a low pass acceleration error filter filtering the acceleration error and having a gain set as a percentage of the total assembly inertia, the acceleration error filter providing the filtered signal to the controller, the controller using the filtered signal to adjust the applied voltages. In some cases the gain is between 40% and 60% of the total assembly inertia. In some cases the gain is approximately 50 percent of the total assembly inertia.

According to another aspect, in some embodiments the controller includes a velocity error filter having a velocity error time constant and wherein the acceleration error filter has an acceleration error time constant that is between two and four times the velocity error time constant. In some cases the acceleration error time constant is approximately three times the velocity error time constant.

Some embodiments of the invention include an apparatus for use with a motor controller that receives a command velocity and that applies voltages to drive a motor at the command velocity, the apparatus comprising a dual inertia lost motion assembly including a motor and a load couplable to the motor, the lost motion assembly characterized by at least some lost motion between the motor and the load, the motor and load together characterized by a total assembly inertia and an acceleration feedback loop including a low pass acceleration error filter where the loop gain is between 40% and 60% of the total inertia, the low pass filter providing a filtered signal to the controller.

Still other embodiments include an apparatus for use with a motor controller that receives a command velocity and that applies voltages to drive a lost motion motor-load assembly including a motor and a load couplable to the motor, the lost motion assembly characterized by at least some lost motion between the motor and the load, the motor and load together characterized by a total assembly inertia, the apparatus comprising an acceleration feedback loop including a low pass acceleration error filter where the loop gain is between 40% and 60% of the total inertia, the low pass filter providing a filtered signal to the controller.

The invention also includes a method for use with a motor controller that receives a command velocity and that applies voltages to drive a lost motion motor-load assembly including a motor and a load couplable to the motor, the lost motion assembly characterized by at least some lost motion between the motor and the load, the motor and load together characterized by a total assembly inertia, the method comprising the steps of providing an acceleration feedback loop from the motor to the controller, providing a low pass acceleration error filter within the feedback loop where the filter gain is between 40% and 60% of the total inertia.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
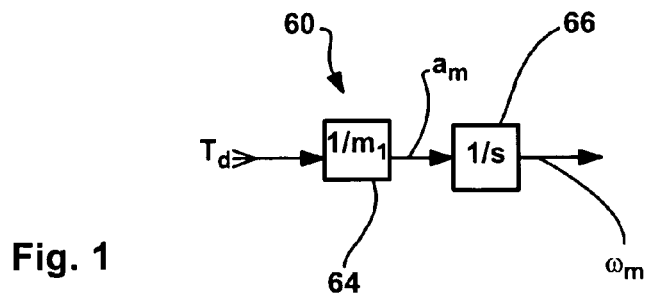
FIG. 1 is a diagram illustrating the effect of a motor inertia on how a disturbance affects a motor velocity.
Figure 2:
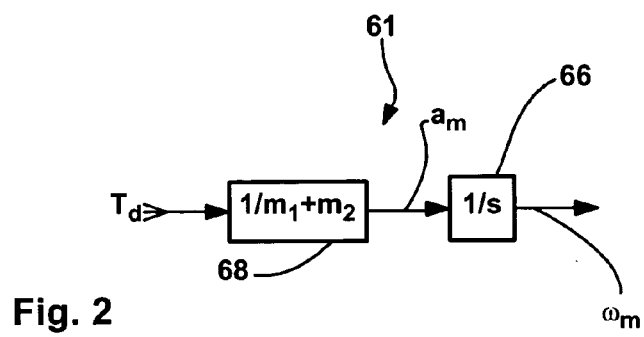
FIG. 2 is similar to FIG. 1, albeit illustrating the effect of a motor inertia and coupled load inertia on how a disturbance affects motor velocity.

Referring now to the drawings wherein like reference numerals correspond to similar elements throughout the several views and, more specifically, referring to FIGS. 1 and 2, simple diagrams 60 and 61 are provided to illustrate the effect that different inertias associated with a motor that is decoupled from a load and a motor that is coupled to a load have on how a torque disturbance $T_d$ effects motor velocity $\omega_m$ are illustrated. In this regard, diagram 60 includes a divider block 64 and an integrator block 66. The torque disturbance $T_d$ is provided to divider block 64 which divides disturbance $T_d$ by a motor inertia $m_1$ thereby providing a motor acceleration value $a_m$. Acceleration value $a_m$ is provided to integrator 66 which integrates the acceleration value yielding motor velocity $\omega_m$.

In FIG. 2, diagram 61 is similar to diagram 60 of FIG. 1 except that the inertia $m_1+m_2$ associated with block 68 replaces motor inertia $m_1$. Here, torque disturbance $T_d$ is provided to divider block 68 which divides disturbance $T_d$ by combined inertias $m_1+m_2$ providing acceleration value $a_m$. Integrator 66 integrates value $a_m$ to yield motor velocity $\omega_m$.

In the case of a motor-load system characterized by at least some degree of lost motion, it should be clear from FIGS. 1 and 2 that the effects of a torque disturbance $T_d$ on motor velocity $\omega_m$ are different when a load is coupled to a motor and when the same load is decoupled from the motor. When the load is decoupled from the motor as in FIG. 1, the torque disturbance $T_d$ has a greater effect on motor velocity $\omega_m$ than when the load is decoupled from the motor as in FIG. 2. In effect, the larger coupled inertia dampens the effect of disturbance $T_d$. Hereinafter the ratio of gains $(m_1+m_2)/m_1$ will be referred to as ratio R.

In the description that follows, first, a diagram corresponding to a classic proportional/integral/derivative (PID) velocity regulator is described. Thereafter, various diagrams that are equivalent to the classic regulator initially described are described to develop a velocity regulator diagram including direct acceleration feedback where the acceleration feedback gain is a function of motor/load inertia. After the desired regulator form is derived, transfer functions corresponding to the inner acceleration loop under different operating conditions are derived and used to identify an optimal acceleration error gain value. More specifically, separate transfer functions where a load is coupled to and decoupled from the load for the inner loop are developed to identify an optimal gain equation and then common R values (i.e., $(m_1+m_2)/m_1$) are used to solve the gain equation and find optimal gain values. After an optimal gain value for most common R values is determined, transfer functions including filter time constant factors are developed for the coupled and decoupled conditions which are then analyzed in light of the optimal gain value to identify an optimal acceleration error time constant for common R values.

Figure 3:
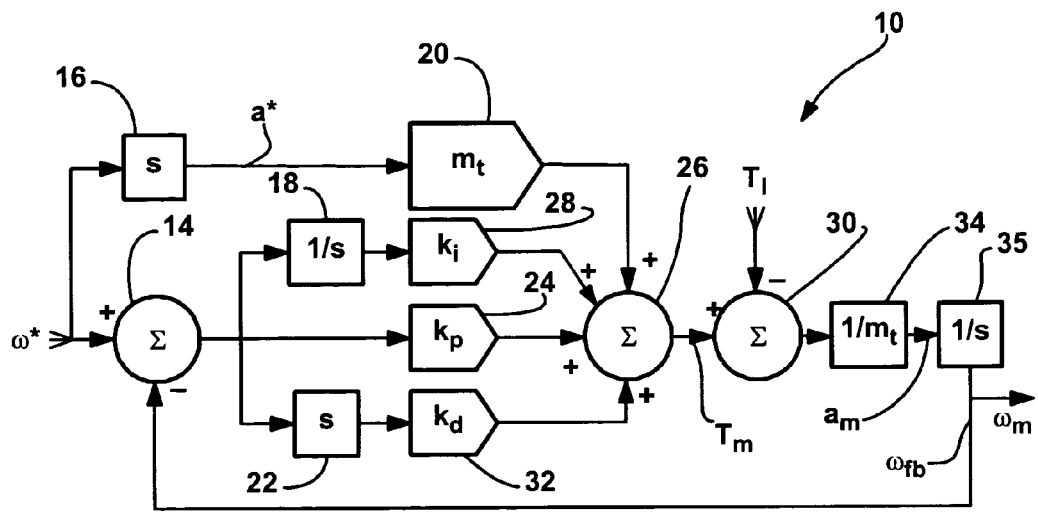
FIG. 3 is a diagram illustrating a prior art motor control system.

Referring now to FIG. 3, an exemplary classic PID velocity regulator diagram 10 receives a velocity command signal $\omega^*$ and causes a motor and load linked thereto to operate at a motor velocity $\omega_m$ equal to the commanded velocity $\omega^*$. Regulator 10 includes three summers, 14, 26 and 30, two derivative blocks 16 and 22, two integrators 18 and 35, four amplifiers 20, 28, 24 and 32 and one divider 34. Velocity $\omega^*$ is provided to derivative block 16 which generates a command acceleration value $a^*$. Acceleration value $a^*$ is provided to amplifier 20 which multiplies acceleration value $a^*$ by the combined or total motor/load inertia $m_t$ (i.e., $m_t=m_1+m_2$) thereby generating a scaled command acceleration value which is provided to summer 26.

Referring still to FIG. 3, a feedback loop provides a velocity feedback signal $\omega_{fb}$ equal to motor velocity $\omega_m$ to summer 14. Summer 14 subtracts feedback signal $\omega_{fb}$ from command velocity $\omega^*$ thereby generating a velocity error signal. The velocity error signal is provided each of integrator block 18, amplifier 24 and derivative block 22. Integrator block 18 integrates the velocity error signal and provides its output to amplifier 28. Amplifier 28 multiplies the integrated velocity error value by an integral gain $k_i$ and provides the scaled up value to summer 26.

Derivative block 22 takes the derivative of the velocity error signal and provides the derivative value to amplifier 32. Amplifier 32 multiplies the received value by a derivative gain $k_d$ and provides the scaled value to summer 26. Amplifier 24 multiples the velocity error value by a proportional gain $k_p$ and provides the scaled value to summer 26.

Summer 26 adds all of the received values and provides a motor torque $T_m$ to summer 30. Summer 30 subtracts a load torque value $T_l$ from motor torque $T_m$ and provides a combined torque value to divider 34. The combined torque value is akin to the disturbance torque $T_d$ in FIGS. 1 and 2. Divider 34 divides the combined torque value by the total motor/load inertia $m_t$ thereby generating a motor acceleration value $a_m$. Acceleration value $a_m$ is provided to integrator 35 which yields the motor velocity value $\omega_m$.

Figure 4:
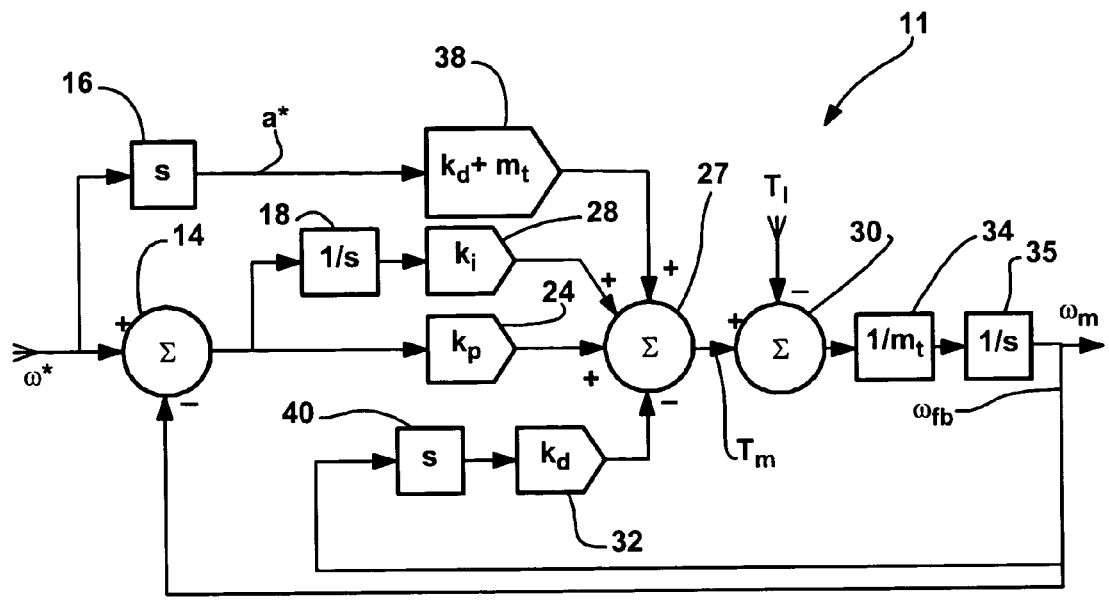
FIG. 4 is a diagram equivalent to the diagram of FIG. 3.

Referring now to FIG. 4, a diagram 11 similar to the diagram 10 in FIG. 3 is provided. In FIG. 4, many of the components are identical to the components of FIG. 3 and therefore, in the interest of simplifying this explanation, components in FIG. 4 that are identical to components in FIG. 3 are identified by the same numbers and are not again described here in detail. Thus, for instance, derivative block 16 in FIG. 4 is identical to derivative block 16 in FIG. 3, summer 30 in FIG. 4 is identical to summer 30 in FIG. 3 and so on.

There are three main differences between FIGS. 3 and 4. First, instead of having a single feedback loop as in FIG. 3, FIG. 4 includes both an outer loop and an inner loop. In FIG. 4, the outer loop is identical to the feedback loop in FIG. 3 and thus provides the velocity feedback signal $\omega_{fb}$ to summer 14. The inner feedback loop in FIG. 4 replaces the feedforward loop in FIG. 3 that included block 22 and amplifier 32. More specifically, the inner loop in FIG. 4 provides the velocity feedback value $\omega_{fb}$ directly to derivative module 22 (i.e., the velocity error value from summer 14 is no longer provided to derivative block 22).

Second, to compensate for the fact that gain $k_d$ is now multiplied by the derivative of the velocity feedback signal $\omega_{fb}$ instead of the derivative of the velocity error value, amplifier 20 in FIG. 3 had been replaced by amplifier 38 in FIG. 4 which has a larger gain equal to $k_d+m_t$.

Third, summer 26 in FIG. 3 has been replaced by summer 27 in FIG. 4 that subtracts the output of amplifier 32 from the sum of the other three signals received by summer 27.

Figure 5:
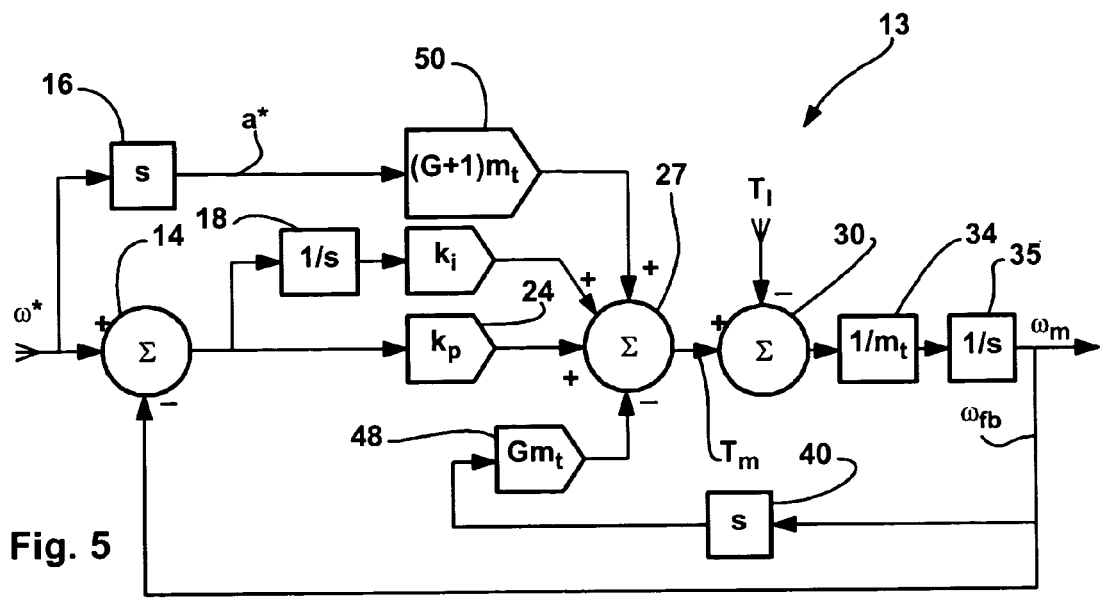
FIG. 5 is a diagram equivalent to the diagram of FIG. 4 and including an inner acceleration feedback loop.

FIG. 5 is an equivalent circuit to FIG. 4. The primary difference between FIGS. 4 and 5 is that derivative gain value $k_d$ has been replaced by a gain expression $Gm_t$ that includes the total motor/load inertia value $m_t$. This change is represented in FIG. 5 by amplifiers 50 and 48 that replace amplifier 38 and 32 and that include inertia associated gain values of $(G+1)m_t$ and $Gm_t$, respectively.

Figure 6:
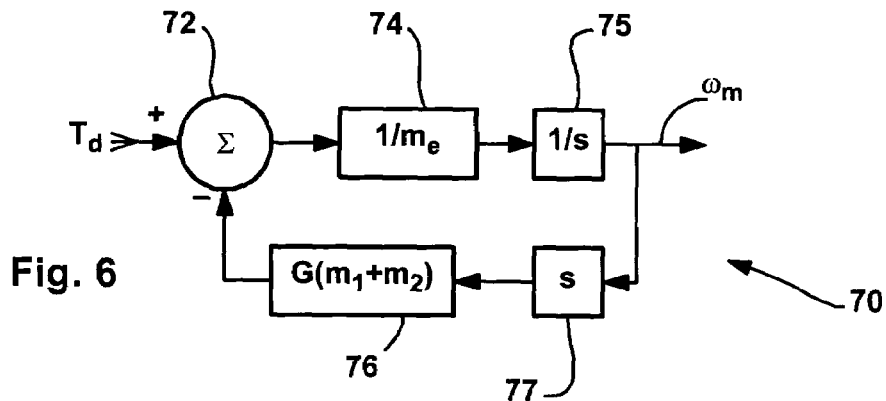
FIG. 6 is a diagram similar to FIG. 1 albeit including an acceleration feedback loop.

Referring now to FIG. 6, a diagram 70 similar to the diagrams illustrated in FIGS. 1 and 2 is provided where the inner feedback loop of FIG. 5 has been added. In FIG. 6, value $m_e$ is an "effective inertia" value which is equal to either motor inertia $m_1$ or the motor/load inertia $m_1+m_2$, depending on whether or not the load is coupled or decoupled to the motor. Thus, where the load is decoupled from the motor, effective inertia $m_e$ is equal to motor inertia $m_1$ and, where the load is coupled to the motor, inertia $m_e$ is equal to the total or combined inertia $(m_1+m_2)$. In FIG. 6, diagram 70 includes a summer 72, a divider 74, an integrator 75, a derivative block 77 and feedback gain block 76.

Referring still to FIG. 6, when the load inertia $m_2$ is engaged or coupled to the motor inertia $m_1$, the transfer function for diagram 70 can be expressed as:

$$\frac{\omega_m}{T_d} = \frac{1}{(1+G)} \cdot \frac{1}{(m_1+m_2)s} \quad \text{Eq. 1}$$

Similarly, when load inertia $m_2$ is decoupled from motor inertia $m_1$, the transfer function for diagram 70 can be expressed as:

$$\frac{\omega_m}{T_d} = \frac{R}{1+GR} \cdot \frac{1}{(m_1+m_2)s} \quad \text{Eq. 2}$$

Thus, the minimum gain with load inertia $m_2$ coupled to motor inertia $m_1$ is $1/(1+G)$ and the maximum gain with load inertia $m_2$ coupled to motor inertia $m_1$ is $R/(1+RG)$.

In order to provide an optimally stable system, it is necessary to optimize the gain deviation around a nominal value. Thus, to minimize gain deviation between the coupled and decoupled conditions, ideally, the following equation should be satisfied:

$$\frac{1}{(1+G)} \cdot \frac{R}{(1+GR)} = 1 \quad \text{Eq. 3}$$

Solving for gain value G, we obtain the following equation:

$$G = \frac{-(1+R)}{2R} + \frac{\sqrt{5R^2-2R+1}}{2R} \quad \text{Eq. 4}$$

Solutions to equation 4 for common values of ratio R are summarized in the following table.

| Solutions to Equation 5 | |
|---|---|
| R | G |
| 4 | .443 |
| 6 | .500 |
| 8 | .529 |
| 10 | .547 |
| 12 | .558 |
| 14 | .567 |

The average G value in the table above is 0.524 and, the range of values is generally between 0.4 and 0.6. Thus, an optimal value for gain G is between 0.4 and 0.6, and is approximately 0.500 independent of which common ratio R exists in a system.

Figure 7:
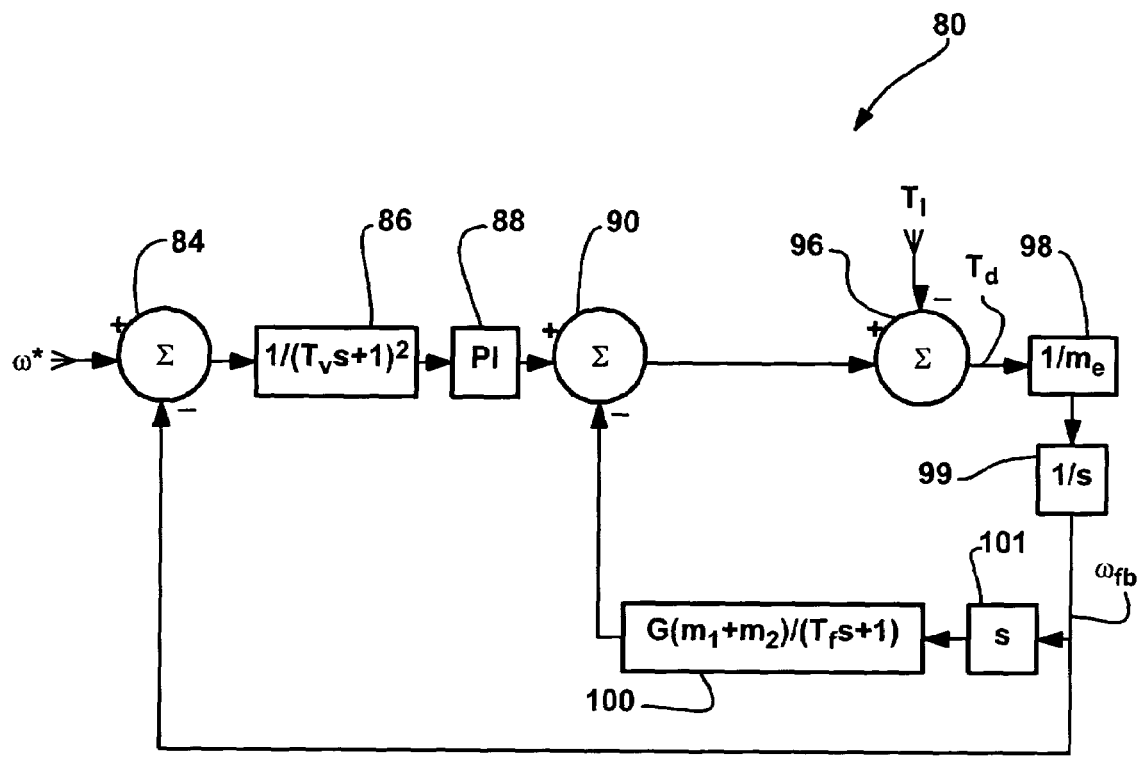
FIG. 7 is a diagram illustrating a control system according to the present invention where filter delays are represented.

Referring now to FIG. 7, a diagram 80 similar to diagram 70 of FIG. 6 is provided. In addition to the components of FIG. 6, FIG. 7 includes additional or modified components that represent filter delays. In this regard, an acceleration error filter delay has been added to the inner loop gain block 100 via the factor $1/(T_f s+1)$ including filter time constant $T_f$. In addition, a velocity error filter delay has been added via block 86 and is represented as two first order filter by factor $$\frac{1}{(T_v s+1)^2}.$$

In addition to the modifications to represent filter delays, FIG. 7 has been modified so that the torque disturbance $T_d$ is represented by the difference between a motor torque value $T_m$ and the load torque value $T_l$.

Referring still to FIG. 7, diagram 80 includes three summers 84, 90 and 96, a velocity error filter block 86, a PI regulator 88, a divider block 98, an integrator block 99, a derivative block 101 and the acceleration feedback block 100 including a delay term in the denominator. Velocity command $\omega^*$ is provided to summer 84 which subtracts a velocity feedback signal $\omega_{fb}$ from the command value $\omega^*$ and generates a velocity error signal.

The velocity error signal is provided to velocity error filter 86 and the output thereof is provided to PI regulator 88. Regulator 88 steps up the received signal and provides its output to summer 90. Summer 90 subtracts the output of filter/delay block 100 from the output of regulator 88 and provides its output as a motor torque value to summer 96. Summer 96 subtracts load torque value $T_l$ from the motor torque value providing the combined torque value to divider block 98. Divider block 98 divides the combined torque value by the effective inertia $m_e$ providing an acceleration value to integrator block 99. Integrator block 99 integrates the acceleration value thereby generating the motor velocity value which is also the velocity feedback $\omega_{fb}$. The velocity feedback $\omega_{fb}$ is provided to derivative block 101 which provides its output to block 100.

Referring still to FIG. 7, the transfer function for the inner loop corresponding to components 90, 96, 98, 99, 101 and 100 is different when the load is coupled to and decoupled from the motor. When the load is coupled to the motor, the transfer function for the inner loop can be expressed as:

$$TF(s) = \frac{1}{(1+G)(m_1+m_2)\cdot s} \cdot \frac{(1+T_f\cdot s)}{\left[1+\frac{T_f\cdot s}{(1+G)}\right]} \qquad \text{Eq. 5}$$

When the load is decoupled from the motor, the transfer function can be expressed as:

$$TF(s) = \frac{R}{(1+GR)(m_1+m_2)\cdot s} \cdot \frac{(1+T_f\cdot s)}{\left[1+\frac{T_f\cdot s}{1+GR}\right]} \qquad \text{Eq. 6}$$

Referring to equation 5 above, when the load is coupled to the motor, the impedance term is:

$$\frac{1+T_f\cdot s}{\left[1+\frac{T_f\cdot s}{(1+G)}\right]} \qquad \text{Eq. 7}$$

A first order approximation of the impedance term can be represented as:

$$1+T_f\cdot \frac{G\cdot s}{1+G} \qquad \text{Eq. 8}$$

Referring once again to FIG. 7, adding an impedance term corresponding to velocity error filter block 86, the impedance term for diagram 80 when the motor and load are coupled can be expressed as:

$$Y(s) = \frac{1+T_f\cdot \frac{Gs}{(1+G)}}{(1+T_v s)^2} \qquad \text{Eq. 9}$$

Next, let:

$$T_v = T_f \cdot \frac{G}{(1+G)} \qquad \text{Eq. 10}$$

Combining equations 9 and 10 yields equation 11:

$$Y(s) = \frac{1}{1+T_v\cdot s} \qquad \text{Eq. 11}$$

and, pole-zero cancellation occurs.

Referring to equation 10 and the values provided in the table above, it should be appreciated that with any of the gain G values in the table, equation 10 yields an inner loop time constant $T_f$ which is approximately 3 times the velocity error filter time constant $T_v$. More specifically, when nominal gain G value of 0.5, the inner loop or acceleration error filter time constant $T_f$ is exactly $3T_v$.

Referring once again to equation 6, the impedance term in equation 6 is:

$$\frac{1+T_f\cdot s}{1+\frac{T_f}{(1+GR)}\cdot s} \qquad \text{Eq. 12}$$

which can be approximated as:

$$1+T_f\cdot \frac{G\cdot R}{1+GR}\cdot s \qquad \text{Eq. 13}$$

Referring again to FIG. 7, adding an impedance term corresponding to velocity error filter block 86 to equation 13, the impedance term for diagram 80 when the load is disconnected from the motor can be expressed as:

$$Y(s) = \frac{\left[1+T_f\cdot \frac{GRs}{1+GR}\right]}{(1+T_v s)^2} \qquad \text{Eq. 14}$$

Approximating the denominator in equation 14 as first order term yields the following equations:

$$Y(s) = \frac{\left[1+T_f\cdot \frac{GR}{1+G\cdot R}\cdot s\right]}{(1+2T_v s)} \qquad \text{Eq. 15}$$

Next, assuming an inner loop filter time constant $T_f$ of $3T_v$ and exemplary gain G and ratio R values of 0.5 and 6, respectively (see again table above), equation 15 can be simplified as:

$$Y(s) = \frac{\left(1+\frac{9}{4}T_v\cdot s\right)}{(1+2T_v\cdot s)} \qquad \text{Eq. 16}$$

As seen in equation 16, when the load is decoupled from the motor, there is near perfect pole-zero cancellation.

In summary, where the acceleration feedback loop gain is set equal to approximately 0.5 and the acceleration error filter time constant $T_f$ is approximately 3 times the velocity error filter time constant $T_v$, for typical ratio R values, the resulting system is very stable and there is virtually no high frequency attenuation of quantization noise.

Figure 8:
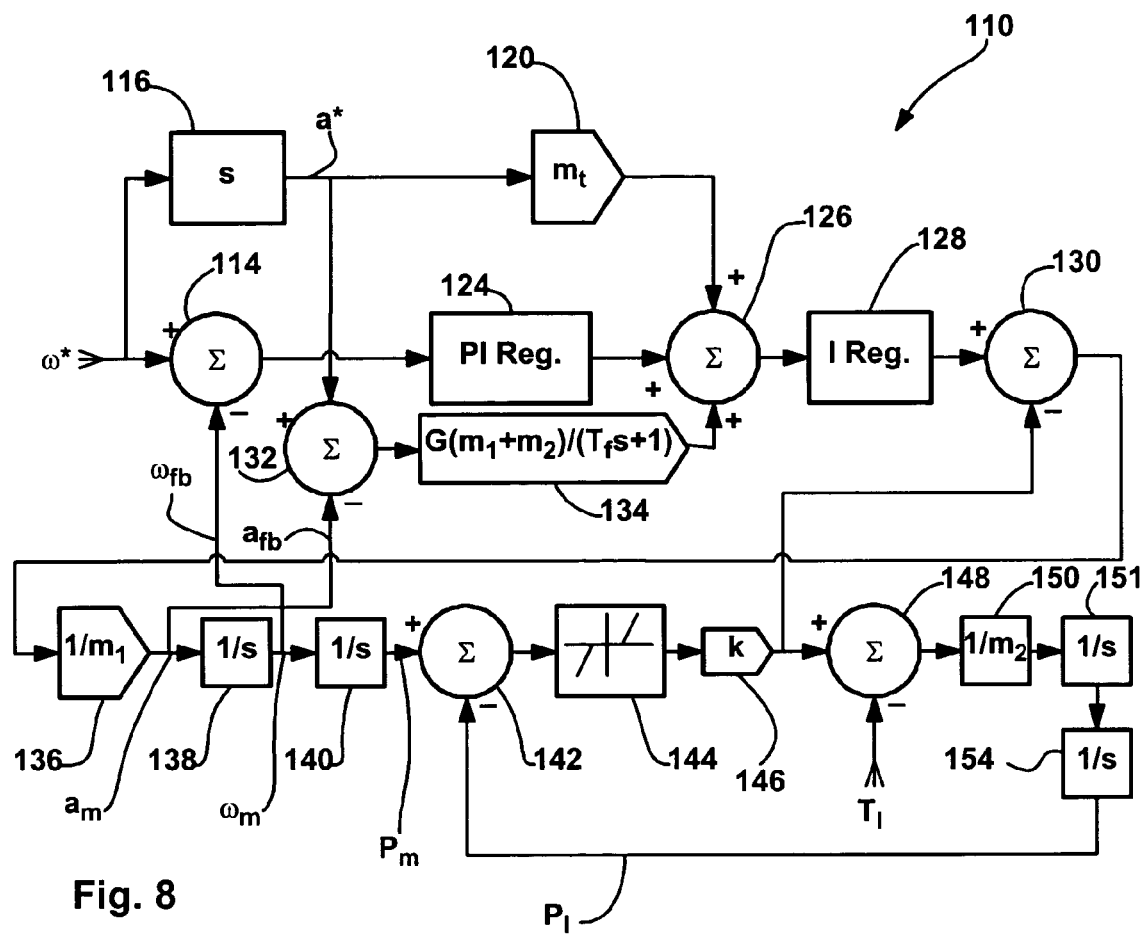
FIG. 8 is a diagram illustrating a control system according to at least one aspect of the present invention.

Referring now to FIG. 8, a exemplary relatively more complex system 110 which reflects a real motor/load system more accurately is illustrated. While system 110 is more complex than the systems described above, the analysis above is still sound and the manner in which system 10 values should be tuned or selected is the same as above. Generally, in FIG. 8, a lost motion block 144 and a spring block 146 are provided which represent disturbances that occur in a typical motor/load configuration characterized by at least some lost motion. Here, the lost motion and spring characteristics along with the load torque $T_l$ and the load inertia $m_2$ impact overall system operation via a summer 130 which provides its output to a divider block 136. The output of block 136 is an acceleration value which is provided a summer 132. In addition to receiving the acceleration value from block 136, summer 132 also receives command acceleration value a* derived from command velocity ω*. Summer 132 subtracts the feedback acceleration value from the command acceleration value a* and provided its output filter block 134. Filter block 134 is tuned according to the teachings above to have a gain G of approximately 0.5 and has a filter time constant $T_f$ which is 3 times the velocity loop time constant $T_v$ (not illustrated in FIG. 8 but nevertheless present in PI regulator 124).

Referring still to FIG. 8, system 110 includes six summer 114, 126, 130, 132, 142 and 148, a derivative module 116, five amplifier blocks 120, 134, 136, 146 and 150, a PI regulator 124, a current regulator 128, four integrator blocks 138, 140, 151 and 154, lost motion block 144 and spring block 146. Velocity command ω* is provided to derivative block 116 which generates command acceleration value a*. Command acceleration value a* is provided to amplifier 120 which multiplies that value by the total motor/load inertia $m_t$ providing its output to summer 126. Velocity command ω* is also provided to summer 114 which subtracts a velocity feedback signal $\omega_{fb}$ from command velocity ω* providing a velocity error value to PI regulator 124. Regulator 124 steps up the error signal and provides is output to summer 126.

Referring still to FIG. 8, summer 132 subtracts an acceleration feedback value $a_{fb}$ from command acceleration value a* providing an acceleration error to filter 134. Filter 134 is tuned as described above and provides its output to summer 126. Summer 126 adds the output of filter 134 to the sum of the other values received and provides is output to current regulator 128. Regulator 128 provides a motor torque value to summer 130.

Summer 130 subtracts the output of spring block 146 from the motor torque value and provides its output to amplifier 136. Amplifier 136 divides the received signal by motor inertia $m_1$ thereby generating a motor acceleration value $a_m$ which is provided to integrator block 138. Block 138 integrates the motor acceleration value $a_m$ thereby generating a motor velocity value $\omega_m$ which is provided to integrator block 140. Block 140 integrates the motor velocity value $\omega_m$ thereby generating motor position value $P_m$. Position $P_m$ is provided to summer 142. Summer 142 subtracts a load position value $P_l$ from the motor position value $P_m$ and provides its output to lost motion block 144. Lost motion block 144 introduces lost motion dynamics and provides its output to spring block 146. Spring block 146 provides spring type dynamics as a function of a spring constant k and provides its output to each of summers 130 and 148. Summer 148 subtracts the load torque $T_l$ from the output of spring block 146 and provides its output to amplifier 150. Amplifier 150 divides the output of summer 148 by load inertia $m_2$ and provides its output to integrator 151. Integrator 151 integrates the received value thereby generating a load velocity signal which is provided to integrator block 154. Block 154 integrates the received value to generate load position value $P_l$ which is fed back to summer 142.

It should be appreciated that the total inertia $(m_1+m_2)$ has to be determined for the coupled motor-load assembly during a commissioning procedure. Such procedures are well known in the art and therefore will not be described here in detail. After total inertia $m_t$ is determined, that value along with the optimal gain G value are used to set the acceleration error filter gain.

While the invention may be susceptible to various modifications and alternative forms, specific embodiments have been shown by way of example in the drawings and have been described in detail herein. However, it should be understood that the invention is not intended to be limited to the particular forms disclosed.

To apprise the public of the scope of this invention, the following claims are made:

What is claimed is:

1. An apparatus for use with a motor controller that receives a command velocity and that applies voltages to drive a motor at the command velocity, the apparatus comprising:

a dual inertia lost motion assembly including a motor and a load couplable to the motor, the lost motion assembly characterized by at least some lost motion between the motor and the load, the motor and load together characterized by a total assembly inertia;

an acceleration error determiner for generating an acceleration error that is the difference between a derivative of the command velocity and a motor acceleration value; and a low pass acceleration error filter filtering the acceleration error and having a gain set as a percentage of the total assembly inertia, the acceleration error filter providing the filtered signal to the controller, the controller using the filtered signal to adjust the applied voltages;

wherein the controller includes a velocity error filter having a velocity error time constant and wherein the acceleration error filter has an acceleration error time constant that is between two and four times the velocity error time constant.

2. The apparatus of claim 1 wherein the acceleration error time constant is approximately three times the velocity error time constant.

3. The apparatus of claim 1 wherein the gain G is determined by solving the following equation:

$$G = \frac{-(1+R)}{2R} + \frac{\sqrt{5R^2 - 2R + 1}}{2R}$$

where R is (m1+m2)/m1 and m1 and m2 are the motor and load inertias, respectively.

4. The apparatus of claim 1 wherein the controller includes a velocity error filter having a velocity error time constant Tv and wherein the acceleration error filter has an acceleration error time constant Tf that is approximated by solving the following equation:

$T_f = T_v(1+G)/G.$

5. The apparatus of claim 1 wherein the gain is between 40% and 60% of the total assembly inertia.

6. The apparatus of claim 1 wherein the gain is approximately 50 percent of the total assembly inertia.

7. The apparatus of claim 1 wherein the acceleration error filter has an acceleration error time constant that is approximately three times the velocity error first order time constant.

8. The apparatus of claim 1 wherein the gain is 52.4 percent of the total assembly inertia.

9. An apparatus for use with a motor controller that receives a command velocity and that applies voltages to drive a motor at the command velocity, the apparatus comprising:

a dual inertia lost motion assembly including a motor and a load couplable to the motor, the lost motion assembly characterized by at least some lost motion between the motor and the load, the motor and load together characterized by a total assembly inertia; and an acceleration feedback loop including a low pass acceleration error filter where the loop gain is between 40% and 60% of the total inertia, the low pass filter providing a filtered signal to the controller;

wherein the controller includes a second order velocity error filter having a velocity error time constant and wherein the acceleration error filter has an acceleration error time constant that is between two and four times the velocity error first order time constant.

10. The apparatus of claim 9 wherein the gain is approximately 50%.

11. The apparatus of claim 9 wherein the acceleration error time constant is approximately three times the velocity error time constant.

12. The apparatus of claim 9 wherein the loop gain G is determined by solving the following equation:

$$G = \frac{-(1+R)}{2R} + \frac{\sqrt{5R^2 - 2R + 1}}{2R}$$

where R is (m1+m2/m1 and m1 and m2 are the motor and load inertias, respectively and, wherein, the controller includes a velocity error filter having a velocity error time constant Tv and wherein the acceleration error filter has an acceleration error time constant Tf that is approximated by solving the following equation:

$$T_f = T_v(1+G)/G.$$

13. An apparatus for use with a motor controller that receives a command velocity and that applies voltages to drive a lost motion motor-load assembly including a motor and a load couplable to the motor, the lost motion assembly characterized by at least some lost motion between the motor and the load, the motor and load together characterized by a total assembly inertia, the apparatus comprising:

an acceleration feedback loop including a low pass acceleration error filter where the loop gain is between 40% and 60% of the total inertia, the low pass filter providing a filtered signal to the controller;

wherein the controller includes a second order velocity error filter having a velocity error time constant and wherein the acceleration error filter has an acceleration error time constant that is between two and four times the velocity error first order time constant.

14. The apparatus of claim 13 wherein the gain is approximately 50%.

15. The apparatus of claim 14 wherein the acceleration error filter has an acceleration error time constant that is approximately three times the velocity error time constant.

16. The apparatus of claim 13 wherein the loop gain G is determined by solving the following equation:

$$G = \frac{-(1+R)}{2R} + \frac{\sqrt{5R^2 - 2R + 1}}{2R}$$

where R is (m1+m2)/m1 and m1 and m2 are the motor and load inertias, respectively.

17. A method for use with a motor controller that receives a command velocity and that applies voltages to drive a lost motion motor-load assembly including a motor and a load couplable to the motor, the lost motion assembly characterized by at least some lost motion between the motor and the load, the motor and load together characterized by a total assembly inertia, the method comprising the steps of:

providing an acceleration feedback loop from the motor to the controller;

providing a low pass acceleration error filter within the feedback loop where the filter gain is between 40% and 60% of the total inertia;

wherein the controller includes a second order velocity error filter having a velocity error time constant and wherein the step of providing the low pass acceleration filter includes providing an acceleration error time constant that is between two and four times the velocity error first order time constant.

18. The method of claim 17 wherein the gain is approximately 50%.

19. The method of claim 17 wherein the step of providing an acceleration error filter having an acceleration error time constant that is between two and four times the velocity error time constant includes providing an acceleration error filter having an acceleration error time constant that is approximately three times the velocity error time constant.

20. The method of claim 17 wherein the loop gain G is determined by solving the following equation:

$$G = \frac{-(1+R)}{2R} + \frac{\sqrt{5R^2 - 2R + 1}}{2R}$$

where R is (m1+m2)/m1 and m1 and m2 are the motor and load inertias, respectively.

* * * * *